United States Statutory Invention Registration [19]

[11] Reg. Number: H577

Bock et al.

[43] Published: Feb. 7, 1989

[54] AQUEOUS DRAG REDUCTION WITH NOVEL ACRYLAMIDE-N-ALKYL ACRYLAMIDE COPOLYMERS

[75] Inventors: Jan Bock; Ralph M. Kowalik, both of Bridgewater; Donald B. Siano, Fanwood, all of N.J.; S. Richard Turner, Pittsford, N.Y.

[73] Assignee: Exxon Research & Engineering Co., Florham Park, N.J.

[21] Appl. No.: 137,929

[22] Filed: Dec. 28, 1987

[51] Int. Cl.[4] ..... C08K 5/00; C08L 39/00

[52] U.S. Cl. ..... 524/555; 523/175; 526/307.2; 526/307.1

*Primary Examiner*—John F. Terapane
*Assistant Examiner*—Susan Wolffe
*Attorney, Agent, or Firm*—Richard E. Nanfeldt

[57] ABSTRACT

A method for reducing frictional drag of water in flow through pipes comprising adding about 5 to about 100 ppm of a water soluble copolymer to said water, said copolymer having the formula:

wherein $R_1$ is an alkyl or cycloalkyl group having about 6 to about 22 carbon atoms, $R_2$ is the same or different alkyl group as $R_1$ or hydrogen, x is about 90.0 to about 99.9 mole %, and y is about 0.1 to about 10.0 mole %.

7 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

REDUCED VISCOSITY vs. CONCENTRATION
FOR VARIOUS Am/$C_{12}$ COPOLYMERS

EFFECT OF SOLVENT REYNOLDS NUMBER ON PRESSURE DROP

AQUEOUS DRAG REDUCTION WITH NOVEL ACRYLAMIDE-N-ALKYL ACRYLAMIDE COPOLYMERS

FIELD OF THE INVENTION

To flow liquids in pipes, energy must be expended to overcome frictional losses. This energy is extracted from the liquid pressure, which decreases along the pipe in the direction of flow. For a fixed pipe diameter, these pressure drops increase with increasing flow rate until a maximum is reached when the pressure drop along the pipe equals the supply pressure at the beginning of the pipe. When flow in the pipe is turbulent (flow Reynolds number=mean fluid velocity×pipe diameter÷fluid kinematic viscosity greater than about 2000) this maximum flow rate can be increased by the addition of small amounts of certain high molecular weight linear polymers to the liquid. These polymers interact with the turbulent flow processes and reduce frictional pressure losses such that the pressure drop for a given flow rate is less, or the maximum flow rate for a given pressure drop is larger. This phenomenon is commonly called drag reduction. It has been used in commercial oil pipelines, fire hoses, and storm sewers to increase the flow capacities of existing systems. It can also be used to reduce supply pressures, pumping costs, and/or pipe diameters for given flow capacities.

BACKGROUND OF THE INVENTION

High molecular weight, water soluble polymers such as polyethylene oxide (PEO), polyacrylamide (PAM) and partially hydrolyzed polyacrylamide (HPAM) have been demonstrated to reduce drag in turbulent flows of aqueous liquids. The instant invention discloses new efficient drag reducing agents in aqueous liquids which are a novel class of acrylamide copolymers containing N-alkyl acrylamide or N,N-dialkyl acrylamide groups.

Polyacrylamide and hydrolyzed polyacrylamide are water soluble polymers that have been previously disclosed in the literature and have found application as drag reduction agents for aqueous solutions which is achieved through a combination of high molecular weight and chain expansion due to repulsion of pendant ionic groups along the polymer chain. These high molecular weight polymers, which are difficult to prepare, are sensitive to shear and are salt-sensitive, thereby limiting their application in highly saline systems. The polymers of the instant invention which are water soluble copolymers of acrylamide and N-alkyl or N,N-dialkyl acrylamide, henceforth called alkyl acrylamide, overcome these aforementioned deficiencies. In the compositions of the instant invention, the presence of a small amount of hydrophobic or water insoluble groups in a hydrophilic, or water soluble polymer chain imparts enhanced solution viscosity relative to a hydrophilic homopolymer such as polyacrylamide of comparable chain length or molecular weight to copolymers of the instant invention.

Synthesis of associating copolymers of the instant invention presents difficulties. The incompatibility of the comonomer pair prevents an effective concentration of one or the other copolymerizing species from being achieved at the locus of the polymerization of the other comonomer. These problems arise during the incorporation of a water soluble monomer into a predominantly hydrocarbon, water insoluble polymer and also in the incorporation of a water insoluble, hydrophobic monomer into a hydrophilic or water soluble polymer. The process of the instant invention overcomes these aforementioned difficulties and permits the formation of novel copolymers of acrylamide and N-alkyl acrylamide which are effective drag reduction agents for aqueous or saline solutions. This process comprises the dispersion of a solvent insoluble monomer into a microemulsion with the incompatible comonomer being dissolved in the solvent, wherein microemulsions are dispersions of droplets of oil in water or water in oil, which have a very large interfacial area per unit mass, thereby bringing these incompatible phases into close spatial proximity. The process of the instant invention comprises the steps of: preparing a surfactant solution which comprises a mixture of a surfactant such as Tween 60, an aliphatic alcohol such as n-pentanol and an alkane such as hexadecane; adding an N-alkyl acrylamide monomer such as dodecyl acrylamide to the surfactant solution; adding water to the surfactant solution with N-alkyl acrylamide monomer; adding with stirring the acrylamide monomer to the mixture of the surfactant solution and water; adding an initiator such as potassium persulfate when the temperature of the reaction solution has reached 50° C. to initiate polymerization and terminatng polymerization after at least 2 hours by precipitation into acetone.

An alternative process for preparing the instant copolymers comprises the steps of forming a mixture of sodium dodecyl sulfate, acrylamide monomer and alkyl acrylamide monomer under a nitrogen atmosphere; adding deoxygenated water to the mixture to form a reaction solution; heating the reaction solution to at least 50° C. ; adding a free radical initiator to the reaction solution to initiate polymerization of the acrylamide monomer and the alkyl acrylamide monomer; and polymerizing the acrylamide monomer and the alkyl acrylamide monomer to form the copolymer of acrylamide/ alkyl acrylamide.

The water soluble polymers of the instant invention which are the drag reduction agents characterized by the formula:

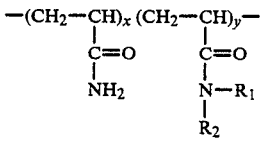

wherein $R_1$ is a $C_6$ to $C_{22}$ alkyl group, straight chained or branched, or cycloalkyl group, more preferably $C_6$ to $C_{20}$, and most preferably $C_6$ to $C_{18}$; $R_2$ is the same or different alkyl group as $R_1$ or hydrogen; x is about 90.0 to about 99.9 mole %, more preferably about 95.0 to about 99.8, and most preferably about 97 to about 99.5; and y is about 0.1 to about 10.0 mole %, more preferably about 0.2 to about 5.0; and most preferably about 0.2 to about 3.0 mole %.

U.S. Pat. No. 4,254,249 discloses a copolymer of N,N-dimethyl acrylamide and acrylamide. The polymers of the instant invention differ from the polymers of U.S. Pat. No. 4,254,249 in that the alkyl acrylamide monomer of the instant invention has only one alkyl group which must have at least six carbon atoms, whereas the polymer of U.S. Pat. No/ 4,254,249 is formed from an N,N-dimethyl acrylamide. Another important distinction is that the alkyl acrylamide monomers of the instant invention are water insoluble, whereas N,N-dimethyl acrylamide is water soluble. This distinction necessitates the specialized process of the instant invention to form the copolymers of the acrylamide and alkyl acrylamide. Copolymers of N,N-dimethyl acrylamide and N-alkyl acrylamide are described in an article entitled, "Affinity Electrophoresis in Gels containing Hydrophobic Substituents", by Jung-Len Chen and Herbert Morawetz, The Journal of Biological Chemistry, Vol. 256, No. 7, September 10, 1981, pp. 9221–9223. The authors state that "Polyacrylamide is insoluble in organic solvents and it is, therefore, difficult to prepare acrylamide copolymers with hydrophobic monomers. We employed, therefore, N,N-dimethyl acrylamide as the main monomer constituent, since its polymers are soluble in both water and organic media."

U.S. Pat. No. 4,098,987 differs from the instant invention in that it discloses the formation of copolymers of acrylamide with acrylic esters or alkyl or alkyloxymethyl acrylamides having molecular weights from 800 to 10,000 amu. The molecular weights of these polymers are substantially different from those of the instant invention which are about 100,000 to about 4,000,000. Additionally, the wt. % of the alkyl acrylamide copolymers of this reference is 20 to 60 wt. which is substantially different from that of the instant invention.

SUMMARY OF THE INVENTION

. The present invention relates to a method for reducing functional drag of water in flow through pipes, conduits or hoses having a continuous bore therethrough which comprises adding a quantity of a water soluble copolymer to water, wherein these copolymers are characterized by the formula:

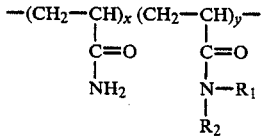

wherein $R_1$ is preferably a $C_6$ to $C_{22}$ alkyl or cycloalkyl group, more preferably $C_6$ to $C_{20}$, and most preferably $C_6$ to $C_{18}$; $R_2$ is the same or different alkyl group as $R_1$ or hydrogen; x is preferably about 90.0 to about 99.9 mole %, more preferably about 95.0 to about 99.8, and most preferably about 97.0 to about 99.5; y is preferably about 0.1 to about 10.0, more preferably about 0.2 to about 5.0, and most preferably about 0.2 to about 3.0 mole %. The instant copolymers of this invention are excellent drag reduction agents for aqueous and saline solutions as exemplified by the preferred embodiments of the instant invention. The process for forming these unique and novel copolymers of the instant invention comprises the steps of forming a surfactant solution of a surfactant such as TWEEN 60, an alcohol such as N-pentanol and an alkane such as hexadecane; adding alkyl acrylamide monomer to the surfactant solution; adding water to the surfactant solution with alkyl acrylamide; adding with mixing acrylamide to the mixture of surfactant solution, alkyl acrylamide and water to form the reaction solution, adding an initiator to the reaction solution maintained at 50° C. to initiate polymerization; polymerizing said reaction solution for a sufficient time to effect polymerization; and recovering the formed copolymer of acrylamide and alkyl acrylamide. An alternative process for preparing the instant copolymers comprises the steps of forming a mixture of sodium dodecyl sulfate, acrylamide monomer and alkyl acrylamide monomer under a nitrogen atmosphere; adding deoxygenated water to the mixture to form a reaction solution; heating the reaction solution to at least 50° C; adding a free radical initiator to the reaction solution to initiate polymerization of the acrylamide monomer and the alkyl acrylamide monomer; and polymerizing the acrylamide monomer and the alkyl acrylamide monomer to form the copolymer of acrylamide/alkyl acrylamide.

DESCRIPTION OF THE PREFERRED EMBODIMENTS

Figure 1:
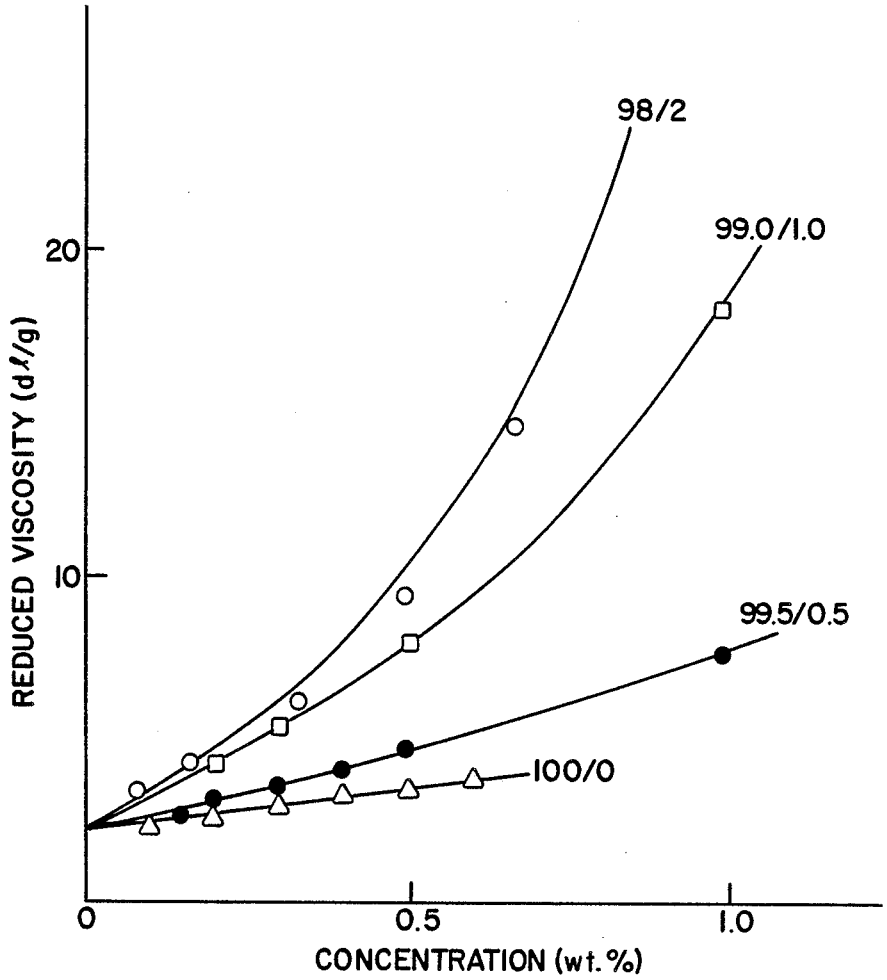
FIG. 1 illustrates a plot of viscosity versus concentration for a series of acrylamide/dodecylacrylamide copolymers.

The present invention relates to a method for reducing functional drag of water in flow through pipes, conduits or hoses having a continuous bore therethrough which comprises adding a quantity of a water soluble copolymer to water, wherein these copolymers are characterized by the formula:

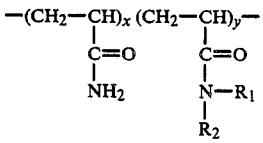

wherein $R_1$ is preferably a $C_6$ to $C_{22}$ alkyl or cycloalkyl group, more preferably $C_6$ to $C_{20}$ and most preferably $C_6$ to $C_{18}$, $R_2$ is the same or different alkyl group as $R_1$ or hydrogen. Typical, but nonlimiting examples of preferred alkyl groups are hexyl, octyl, decyl, dodecyl and steryl groups. X is preferably about 90.0 to about 99.9 mole %, more preferably about 95.0 to about 99.8 mole %, and most preferably about 97.0 to about 99.5 mole % and y is preferably about 0.1 to about 10.0 mole %, more preferably about 0.2 to about 5.0 mole % and most preferably about 0.2 to about 3.0 mole %.

The concentration of the copolymer added to the water flowing in the pipe conduit or bore in order to achieve reductions in the friction drag of water is about 5 to about 100 ppm, more preferably about 10 to about 95, and most preferably about 15 to about 90 ppm.

The viscosities of these solutions were easured by means of a Contraves TM low shear viscometer model, LS100 using a No. 1 cup and No. 1 bob. Temperatures were controlled to ±0.1 ° C, and measurements were made at a rotational speed that gave a shear rate of 1.28 $s^{-1}$. The concentration dependence of the specific viscosity of the solutions are plotted in FIG. 1 for different mole fractions of dodecyl acrylamide. As the mole fraction of hydrophobic dodecyl acrylamide is increased in the copolymers, the specific viscosity per unit mass of polymer also increases. An important feature demonstrated by these data is that the intercepts at zero concentration are independent of the mole fraction of dodecyl acrylamide. This intercept is the intrinsic viscosity, defined as:

$$[\eta] \lim_{c \to o} \frac{\eta - \eta_o}{\eta_o c}$$

where $\eta$ is the viscosity of the solvent, is the measured viscosity of the solution with a concentration of polymer c. This intrinsic viscosity is related to the molecular parameters for a homopolymer by:

$$[\eta] = 2.5\, N_A \frac{V_h}{M_W}$$

where $N_A$ is the Avagadro number, $M_w$ is the polymer molecular weight and vh is the hydrodynamic volume. For copolymers with a repeating backbone unit, the hydrodynamic volume is given by:

$$v_h = \frac{4\pi}{3}\, \xi_3 R_G^3$$

where $R_G$ is the radius of gyration of the polymer, and is a dimensionless constant with a theoretical value of 0.875 for polymer having a random chain conformation. -]The radius of gyration is given by:

$$R_G = \beta v 0.6$$

where $\beta$ is an effective bond length and "is the degree of polymerization. The molecular weight of a copolymer with a mole fraction 1-y of acrylamide ($M_w$=71) and dodecyl acrylamide ($M_w$=239) is given by:

$$M_w = [(1-y)\ 71 + 239y]$$

or $$M_w = (71 + 168y)$$

so $$[\eta] = \frac{10\pi}{3} \cdot N_A \beta^3 \xi^3 \cdot \frac{v^{0.8}}{71 + 168y}$$

This formula permits one to compare intrinsic viscosities for acrylamide-dodecyl acrylamide copolymers in a simple way. For example, the copolymer with x =0.98 can be compared with the homopolymer, which has x =1.0:

$$\frac{[\eta]_{0.98}}{[\eta]_{1.0}} = \left[\frac{v_{0.98}}{v_{1.0}}\right]^{0.8} \frac{71 + 168}{71 + 168(0.98)} = 1.01 \left[\frac{v_{0.98}}{v_{1.0}}\right]^{0.8}$$

Thus, if the degree of polymerization for the two polymers are the same, their intrinsic viscosities should differ by only one percent. Conversely, if the intrinsic viscosities of the two polymers differ by only a few percent, then we may infer that their degrees of polymerization are nearly the same. FIG. 1, therefore, shows that the degree of polymerization of the copolymers and homopolymer are very nearly all equal, and that introduction of the dodecyl acrylamide produces a beneficial enhancement in viscosity.

The copolymers of the acrylamide and the N-alkyl acrylamides are formed by the free radical copolymerization process which comprises the steps of: formLng a mixture of a surfactant, an alcohol and an alkane solvent adding N-alkyl acrylamide monomer to the mixture; adding deaerated water under N2 to the mixture; adding acrylamide monomer to the mixture; mixing the mixture until a homogeneous reaction solution has been achieved; adding sufficient free radical initiator to the reaction solution at a temperature of at least 50° C; polymerizing the acrylamide monomer and alkyl acrylamide for a sufficient period of time at a sufficient temperature to effect polymerization; and recovering the formed copolymer from the reaction solution.

Suitable surfactants used in forming the surfactant solution are Tween-60 (ICI Americas), sodium oleate, sodium laurate, ethylene oxide propylene oxide copolymers (Pluronics) and oleyl ethoxylate. Tween-60 is a polyoxyethylene-20-Sorbitan Monostearate having the formula:

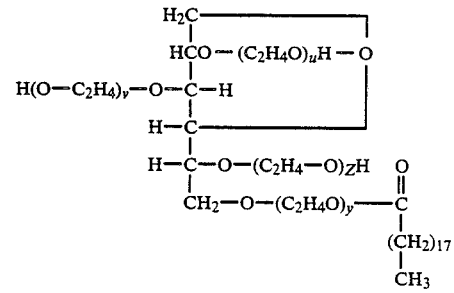

II wherein u +v +y +z =20.

Suitable alcohols used in forming the surfactant solution are n-pentanol, butanol, hexanol, and isopropyl alcohol. Suitable N-alkane solvents used are hexadecane, dodecane, decane, and hexane. The concentration of alcohol is about 20 to about 40 wt.% of the surfactant solution, the concentration of the N-alkane solvent is about 1 to 10 wt.% of the surfactant solution, and the concentration of the surfactant is about 30 to about 80 wt.%.

Suitable N-alkyl acrylamide monomers useful in the preparation of the copolymers of the instant invention are N-alkyl acrylamides having an N-alkyl group having about 6 to about 22 carbon atoms, more preferably 7 to 20; and most preferably 8 to 18. Typical, but nonlimiting examples are hexyl acrylamide, octyl acrylamide, decyl acrylamide, dodecyl acrylamide, stearyl acrylamide and N,N-dioctyl acrylamide. The selection of the proper surfactant to use in the polymerization reaction is dependent on the alcohol and n-alkane solvent used in the polymerization. The Nalkyl acrylamide monomers of this invention are produced according to the procedure as set forth in Case Nos. C-1358 and C-1402.

Suitable free radical initiators for the instant free radical-copolymerization process are potassium persulfate, sodium thiosulfate mixture, benzoyl peroxide and other common free radical initiators. The concentration of the free radical initiator is about 0.1 to about 0.50 grams per 100 grams of acrylamide monomer and N-alkyl acrylamide-monomer.

Polymerization of the acrylamide monomer and N-alkyl acrylamide monomer is effected at a temperature of about 25 to about 70° C., more preferably at about 35 to about 65° C., and most preferably at about 45 to about 55° C. for a period of about 1 to about 48 hours, more preferably at about 2 to about 36 hours, and most preferably at about 4 to about 24 hours.

A suitable method for recovery of the formed copolymer from the reaction solution comprises precipitation into acetone or other suitable non-solvents.

The following examples illustrate the present invention without, however, limiting the same hereto.

EXAMPLE 1

Preparation of Dodecyl and Octyl Acrylamide

A 500 ml., 4 necked round bottom flask was equipped with a condenser, thermometer, $N_2$ inlet, magnetic stir bar and dropping funnel. After purging with $N_2$, the n-octylamine, 14.35 g. (0.11 mol.) and triethylamine, 12.35 g. (0.41 mol.) were mixed with 50 ml. of toluene and added to the flask. The acryloyl chloride, 10.0 g. (0.11 mol.) was dissolved in 50 ml. of toluene and added to the dropping funnel. The reaction is exothermic so the temperature was controlled via an ice bath. 1he acryloyl chloride was added dropwise so that the contents of the flask stayed below 40° C. . The resulting slurry was stirred for an additional hour and then filtered to remove the triethylamine hydrochloride. The filtrate was stripped in a rotary evaporator (removal of toluene). The resulting oil was taken up into 240 ml. of acetone and then cooled to −70° C. in a dry ice bath. The monomer crystals were filtered on a coarse filter under $N_2$ and then vacuum dried at room temperature for one day. A yield of 14.3 g. ( 70%) of white crystals were obtained. A melting range of 36 to 37° C. was observed. The monomer appeared to soften on extended storage at room temperature. perature.

To prepare the dodecyl acrylamide, the same procedure was used except 20.36 g. (0.11 mol.) of n-dodecylamine was substituted for the n-octylamine.

EXAMPLE 2

Copolymerization of 99.25/0.75 Mole % Acrylamide N-(n-Octyl)Acrylamide

A one liter flask was equipped with an electric stirrer, reflux condenser, thermometer and inert gas inlet and outlet. The flask was flushed with nitrogen for one half hour. Then 15.85 g. of sodium dodecyl sulfate (Polysciences), 14.76 g. of acrylamide (twice recrystallized) and 0.288 g. of octyl acrylamide and 470.7 g. of water that was deaerated with bubbling nitrogen were added to the reaction flask. After a few minutes a homogeneous water clear mixture resulted. It was then heated to 50° C. and 0.01 g. of potassium persulfate initiator was added. After 24 hours of stirring at this temperature, the mixture had become viscous, but it remained homogeneous and transparent. It was then cooled to room temperature, removed from the reaction vessel and precipitated by the addition of acetone. The polymer was then vacuum dried at room temperature for four days. The result was 9.2 g. of a pure white friable solid. This copolymer had an intrinsic viscosity of $[\eta]=6\pm1$ dl/g in 2% NaCl solution at 25° C. . The presence of the octyl pendant groups was confirmed by solid state 13C NMR spectroscopy and by the shape of the viscosity vs. concentration plots of the copolymer vis-a-vis the homopolymer. Other copolymer compositions were obtained from the same recipe by varying the amount of the alkyl acrylamide comonomer.

EXAMPLE 3

Drag Reduction of Novel Copolymers

Drag reduction effectiveness was evaluated by flowing polymer/distilled water solutions through a 2.13 mm inside diameter stainless steel tube and measuring the resulting frictional pressure drop. Flows were generated by first loading a bladder accumulator with a previously dissolved polymer/distilled water solution and then discharging the solution through the tube test section. The bladder accumulator used (Greer-Olaer Model 30A - 2½) is a 10 liter pressure vessel which contains an inflatable rubber bladder, a port for loading and discharging gas from the inside of the bladder and a port for loading and discharging liquid solutions from the space between the bladder and the interior vessel walls. To load the vessel with liquid, the bladder was first expanded with nitrogen gas such that the bladder filled the inside of the vessel. The liquid solution was then siphoned into the vessel as the bladder was evacuated. Subsequent charging of the vessel with nitrogen gas produced a flow of liquid which was directed to the 2.13 mm diameter tube. Pressure drops were measured across a 48 cm straight segment of the tube with a pair of flush mounted tube wall pressure taps and a differential pressure transmitter. Flow rates were measured by weighing samples of the effluent liquid collected over measured time periods.

Flow rates in the drag reduction experiments ranged from about 8 to 20 g/s; these correspond to solvent Reynolds numbers from about 5000 to 13000 (solvent Reynolds number=mean flow velocity×tube diameter+solvent kinematic viscosity). Drag reduction was measured by comparing pressure drops of the polymer/distilled water solutions with pressure drops of the distilled water solvent at equal flow rates. Results were expressed as percent drag reduction which is defined as follows:

$$\text{Percent Drag Reduction} = \frac{\text{Pressure Drop (Solvent)} - \text{Pressure Drop (Solution)}}{\text{Pressure Drop (Solvent)}} \times 100$$

Figure 2:
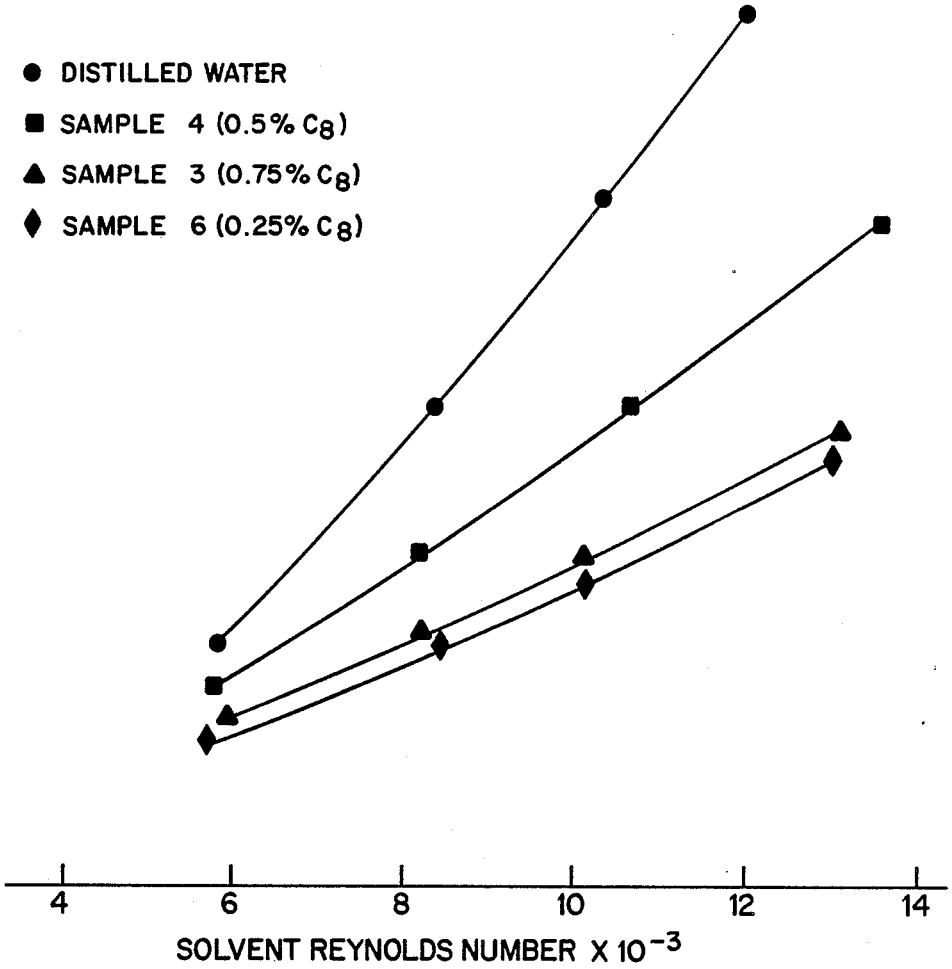
FIG. 2 illustrates a plot of pressure drop versus solvent Reynolds number for acrylamide/octyl acrylamide copolymers.

Typical drag reduction results from experiments with several novel acrylamide copolymer solutions are given in Table I. Significant drag reduction was observed for all listed solutions. Each solution contained 89 parts per million (by weight) of polymer. Additional data relating pressure drops to solvent Reynolds numbers are given in FIG. 2; sample numbers in this figure correspond to those in Table I.

TABLE I

DRAG REDUCTION DATA

| | Hydrophobe | | Solvent | Drag |
|---|---|---|---|---|
| Sample | Type | Level (Mole %) | Reynolds Number | Reduction (%) |
| 1 | $C_8$ | 1.5 | 10,300 | 20 |
| 2 | $C_8$ | 1.0 | 10,500 | 37 |
| 3 | $C_8$ | 0.75 | 10,300 | 47 |
| 4 | $C_8$ | 0.5 | 10,400 | 33 |
| 5 | $C_{12}$ | 0.5 | 10,500 | 51 |
| 6 | $C_8$ | 0.25 | 10,500 | 52 |

What is claimed is:

1. A method for reducing frictional drag of water in flow through pipes comprising adding about 5 to about 100 ppm of a water soluble copolymer to said water, said copolymer having the formula:

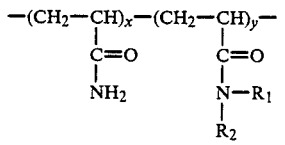

wherein $R_1$ is an alkyl or cycloalkyl group having about to about 22 carbon atoms, $R_2$ is the same or different alkyl group as $R_1$ or hydrogen, x is about 90.0 to about 99.9 mole %, and y is about 0.1 to about 10.0 mole %, wherein the intrinsic viscosity of said copolymer is about 1 to about 10 dl/g.

2. A method according to claim 1, wherein R is an alkyl group having about 6 to about 18 carbon

3. A method according to claim 1, wherein x is about 95.0 to about 99.8 mole % and y is about 0.2 to about 5.0 mole %.

4. A method according to claim 1, wherein the copolymer is of acrylamide/dodecyl acrylamide.

5. A method according to claim 1, wherein the copolymer is of acrylamide/octyl acrylamide.

6. A method according to claim 1, wherein the copolymer is of acrylamide/hexyl acrylamide.

7. A method according to claim 1, wherein the copolymer is of acrylamide/decyl acrylamide.

* * * * *